Nov. 3, 1964  S. N. SMALL  3,155,353
ADJUSTABLE SUPPORT FOR UMBRELLAS
Filed Sept. 28, 1962
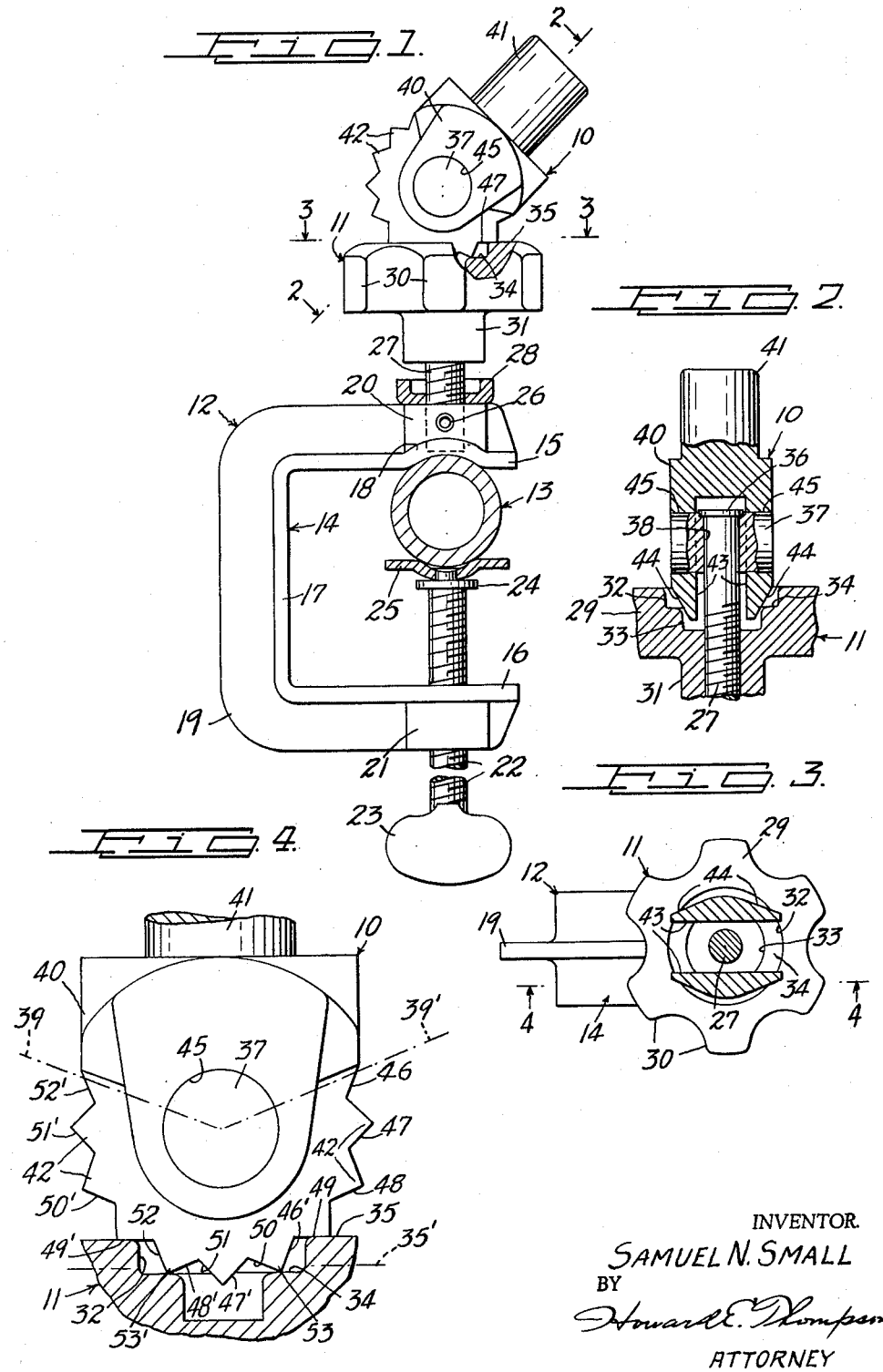
INVENTOR.
SAMUEL N. SMALL
BY
Howard E. Thompson
ATTORNEY

United States Patent Office 3,155,353
Patented Nov. 3, 1964

3,155,353
ADJUSTABLE SUPPORT FOR UMBRELLAS
Samuel N. Small, Valley Stream, N.Y., assignor to Alfred G. Cohen and Paul Weiss, Flushing, N.Y.
Filed Sept. 28, 1962, Ser. No. 226,995
6 Claims. (Cl. 248—40)

This invention relates to devices for use in mounting umbrellas in conjunction with various supports. More particularly, the invention deals with a device having means for clamping the same in connection with a support, as well as means for providing circumferential adjustment of the umbrella supporting member, including angular adjustment, in providing tilt through an arc materially greater than 100°.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a side view of a device made according to my invention, illustrating the umbrella supporting member of the device in an angular position, with parts of the construction broken away and in section and illustrating the clamp of the device arranged upon a support.

FIG. 2 is a section on the line 2—2 of FIG. 1 through the umbrella supporting member, with part of the lock element of the device shown in section.

FIG. 3 is a section on the line 3—3 of FIG. 1; and

FIG. 4 is an enlarged sectional view on the line 4—4 of FIG. 3, with parts of the construction broken away.

Considering FIG. 1 of the drawing, it will appear that the device comprises three basic parts, namely an umbrella supporting member 10, a lock element 11 and a clamp 12, the latter being adapted to engage a suitable support, as, for example, a tubing shown in section at 13.

The clamp 12 comprises a U-shaped body 14 defined by spaced walls 15 and 16 joined by a crosshead 17, the wall 15 having a curved socket, as at 18, to form a jaw-like member, adapting the clamp for engagement with rounded supports, such as the tubing 13. The walls 15, 16 and 17 are reinforced by a central rib 19 and the rib on the walls 15 and 16 includes enlarged bearing portions 20 and 21. Adjustably mounted in the bearing portion 21 is a clamp screw 22 having a fingerpiece end 23. The other end of the screw supports, adjacent a collar 24, a swiveled recessed jaw member 25, also facilitating engagement with rounded supports, as at 13. 25, as well as the wall 15, can also engage flat surfaces as, for example, the edge of a table, bench or other support.

Coupled with the bearing 20 and keyed thereto, as by the key 26, is an axis shaft or pin 27 threaded into the bearing and having a lock nut 28 thereon engaging the outer surface of the bearing 20, as clearly shown. Rotatable on the axis 27 is the lock element 11, comprising a head 29 having a rib periphery, as clearly seen at 30 in FIG. 3 of the drawing, the head having a reduced sleeve 31 threaded to engage the axis 27. The upper surface of the head 29 has a large diameter recess 32, inwardly of which is a smaller diameter recess 33, forming therebetween a shoulder 34. The upper surface around the large diameter recess 32 is flat, as clearly seen at 35 in FIG. 4 of the drawing.

The upper end of the axis shaft or pin 27 includes a shallow head 36, as clearly noted in FIG. 2 of the drawing. Mounted on 27, adjacent 36 is a pivot pin 37, having a bore 38, in which 27 is snugly, but freely mounted. The pin 37 forms the pivotal support of the member 10 for swinging the member 10 through an arc of approximately 135°, as diagrammatically illustrated by the dot-dash lines 39, 39' in FIG. 4 of the drawing, this movement being provided to support an umbrella in various tilted positions in obtaining the desired protection or shelter.

The umbrella supporting member 10 comprises a substantially U-shaped or yoke-shaped body 40, the crosshead portion of which includes an outwardly projecting stud or pin 41, with which a conventional type of umbrella or sunshade can be coupled in any desired manner. No showing of the umbrella is made, as umbrellas of this type and kind are well-known in the art. The opposed sides of the body 40 are of similar construction and include, at the periphery thereof, circumferentially spaced teeth 42, inner surfaces of which are straight, as clearly noted at 43 in FIG. 3 of the drawing, and also indicated in FIG. 2; whereas, outer surfaces are bevelled, as seen at 44. The side walls of the body 40 include apertures, as seen at 45, to provide the bearing support for the pin 37.

It will be apparent from a consideration of FIG. 2 of the drawing that axial movement of the pin 37 is checked by the head 36 of the axis 27, so that the member 10 is at all times maintained in substantial axial alinement with the element 11.

The arrangement of the teeth 42 on the side wall of the body 40 is such as to provide alined surfaces between spaced teeth in order that these alined surfaces of the teeth can be brought into greater engagement with the upper flat surface 35 of the element 11. Attention is here directed specifically to the showing in FIG. 4, from which it will appear that surfaces 46, 46' are in alinement, 47, 47'; 48, 48'; 49, 49'; 50, 50'; 51, 51' and 52, 52' are also in alinement. In FIG 4, the alined surfaces 29, 29' are shown in operative gripper engagement with the surface 35 of the element 11.

In the several locked adjustments of the member 10 with the element 11, terminal ends of adjacent teeth will be brought into close proximity to, and in some instances can engage, the shoulder 34, for example, the engagements, as indicated at 53 and 53' in FIG. 4 on the teeth adjacent and intermediate the surfaces 49, 49'. With the parts in this position, the member 10 is securely fixed in an adjusted position. The showing of FIG. 4 illustrates the member 10 in the upright position; whereas, in FIG. 1 of the drawing, the member 10 is illustrated in one of its tilted positions, wherein the surface 47, for example, is in engagement with the surface 35, the corresponding surface 47' being also in engagement. The partial sectioning of FIG. 1 clearly illustrates engagement of 47 with 35.

In the several figures, the element 11 is shown in its locked position. It will be understood, however that in rotating this element to move the same downwardly or, in other words, to bring the surface 35 to a position illustrated by the dot-dash line 35' of FIG. 4, the element 11 will be moved out of operative engagement with the teeth of the member 10 and permit free rotation of the member 10 on the axis 27, as well as free swinging movement of 10 upon the pin 37 into any desired position within the range diagrammatically illustrated by the dot-dash lines 39, 39' of FIG. 4.

In assemblage of the primary parts 10, 11 and 12, the pin 37 is positioned in the apertures 45 and the member 10 is swung into position with 41 arranged at right angles to the hole or bore 38 of the pin, at which time, the shaft or axis 27 is passed down through the bore 38 of the pin to extend the threaded end of 27 or, in other words, to position the parts, as shown in FIG. 2, after which, the element 11 is mounted upon the threaded end of 27, the lock nut 28 also mounted on said threaded end below the element 11, after which, the threaded end is passed through the bearing 20 until a pre-formed hole in the threaded end of 27 is in registered position to receive the key 26, as clearly shown in FIG. 1, after which, the nut 28 is moved into operative position. This nut serves simply to reinforce attachment of 28 to the clamp 12. Sufficient clearance will be allowed between the nut 28 and the sleeve 31 to allow the element 11 to move into position to bring the surface 35 to a position at least as low as 35', so that the socket portion of the element 11 will clear all of the teeth 42 of the member 10.

From the foregoing, it will be apparent that the above procedure automatically couples the parts 10 and 11 with the shaft or axis 27.

The recesses 32, 33 form in the element 11 a socket, in which part of the member 10 operates, particularly when the member 10 is in locked position on the clamp. The member 10 may be said to comprise an object or article supporting member. It will also be apparent that the pin 37 is rotatably mounted upon the upper end portion of the axis 27 and forms a pivot, upon which the member 10 can swing to the degrees mentioned. The fact that the axis 27 is fixed to the clamp, all movement of 10 and 11 is on the pin or shaft forming this axis.

Having fully described my invention, what I claim as new and desire to secure by Letters Patent is:

1. In devices of the character defined, a shaft, a pin rotatably mounted on one end of the shaft, a member swingably mounted on said pin, the other end portion of said shaft being threaded, a lock element in threaded engagement with said shaft for movement longitudinally thereof toward and from said member, and said member and element having on adjacent surfaces thereof interengaging means for retaining said member in different circumferential and angular positions with respect to said shaft.

2. An adjustable supporting device comprising means fixed and keyed to one end of the shaft for attachment thereof to a suitable support, an object supporting member, means for swingably and rotatably mounting said member upon the outer end portion of said shaft, a lock element in threaded engagement with said shaft for movement longitudinally thereof toward and from said member, said element including an annular socket portion, into which part of said member extends in movement of said element into clamping engagement with said member to retain the member in predetermined adjusted position on said shaft, said second named means comprising a pin rotatable on said shaft, and said member being swingable on said pin in moving said member into different angular positions with respect to said shaft.

3. An adjustable supporting device, comprising a shaft, means fixed and keyed to one end of the shaft for attachment thereof to a suitable support, an object supporting member, means for swingably and rotatably mounting said member upon the other end portion of said shaft, a lock element in threaded engagement with said shaft for movement longitudinally thereof toward and from said member, said element including an annular socket portion, into which part of said member extends in movement of said element into clamping engagement with said member to retain the member in predetermined adjusted position on said shaft, said part of said member including pairs of teeth operatively engagnig said element at and adjacent the socket portion in retention of said member in predetermined adjusted positions on said shaft, said member being yoke-shaped in form defining spaced walls, said teeth being on the periphery of said walls, and predetermined teeth of both walls of said member having alined surfaces to operatively engage a surface of said element bordering said socket portion.

4. A device as defined in claim 3, wherein said member includes projecting means for attachment of an object therewith.

5. An adjustable supporting device, comprising a shaft, means fixed and keyed to one end of the shaft for attachment thereof to a suitable support, an object supporting member, means for swingably and rotatably mounting said member upon the other end portion of said shaft, a lock element in threaded engagement with said shaft for movement longitudinally thereof toward and from said member, said element including an annular socket portion, into which part of said member extends in movement of said element into clamping engagement with said member to retain the member in predetermined adjusted position on said shaft, and said member including pairs of alined angular surfaces adapted to engage a surface of said element bordering said socket portion in securing said member in several different angular and circumferential positions with respect to said shaft.

6. A device as defined in claim 5, wherein said member includes a pair of spaced walls on opposed sides of said shaft, and said pairs of alined angular surfaces being alined on both of said walls.

References Cited in the file of this patent
UNITED STATES PATENTS

| | | |
|---|---|---|
| 1,372,431 | Husi | Mar. 22, 1921 |
| 1,756,942 | Eddy | May 6, 1930 |
| 2,458,881 | Steuer | Jan. 11, 1949 |
| 2,890,847 | Minton | June 16, 1959 |